US 8,471,979 B2

(12) United States Patent
Zhang

(10) Patent No.: US 8,471,979 B2
(45) Date of Patent: Jun. 25, 2013

(54) BACK LIGHT MODULE AND LIQUID CRYSTAL DISPLAY DEVICE USING THE SAME

(75) Inventor: Tian Zhang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 88 days.

(21) Appl. No.: 13/258,590

(22) PCT Filed: Aug. 19, 2011

(86) PCT No.: PCT/CN2011/078671
§ 371 (c)(1),
(2), (4) Date: Sep. 22, 2011

(87) PCT Pub. No.: WO2013/020304
PCT Pub. Date: Feb. 14, 2013

(65) Prior Publication Data
US 2013/0038813 A1    Feb. 14, 2013

(30) Foreign Application Priority Data
Aug. 10, 2011   (CN) .............................. 201120289523

(51) Int. Cl.
*G02F 1/1335*   (2006.01)
*F21V 7/00*   (2006.01)

(52) U.S. Cl.
USPC ............... 349/62; 349/56; 349/113; 362/609; 362/97.1; 362/97.2; 362/97.4

(58) Field of Classification Search
USPC .............. 349/56, 58, 113, 62; 362/97.1, 97.2, 362/97.3, 97.4, 609
See application file for complete search history.

(56) References Cited

U.S. PATENT DOCUMENTS

| | | | | |
|---|---|---|---|---|
| 7,264,364 B2 * | 9/2007 | Chen et al. | | 362/29 |
| 7,701,529 B2 * | 4/2010 | Kogure et al. | | 349/58 |
| 2007/0047225 A1 * | 3/2007 | Sudo | | 362/225 |
| 2007/0230217 A1 * | 10/2007 | Sakaki | | 362/624 |
| 2008/0186431 A1 * | 8/2008 | Imojo et al. | | 349/65 |
| 2013/0038813 A1 * | 2/2013 | Zhang | | 349/62 |

FOREIGN PATENT DOCUMENTS

| | | |
|---|---|---|
| CN | 1779524 A | 5/2006 |
| CN | 101114078 A | 1/2008 |
| CN | 101162316 A | 4/2008 |
| CN | 101162325 A | 4/2008 |
| CN | 101308285 A | 11/2008 |

OTHER PUBLICATIONS

Chen Yajuan, the International Searching Authority written comments, May 2012, CN.

* cited by examiner

*Primary Examiner* — Brian Healy
(74) *Attorney, Agent, or Firm* — IPro, Inc.; Na Xu

(57) ABSTRACT

The present invention discloses a backlight module and a LCD using the same. Said backlight module comprises a light guide plate, a reflection sheet and a backplane, wherein said reflection sheet is arranged under the light guide plate; said backplane is arranged under the reflection sheet and partially supports the reflection sheet; and said reflection sheet is bent to form one or more supporting ribs for supporting the backplane to prevent the reflection sheet from drooping. The present invention solves the problem that the reflection sheet is affected by heat and then is easy to droop, by bending the reflection sheet of the backlight module to form the one or more supporting ribs for supporting the reflection sheet, and has the advantages of low cost and no negative influence on other components and system structure of the backlight module.

18 Claims, 2 Drawing Sheets

BACK LIGHT MODULE AND LIQUID CRYSTAL DISPLAY DEVICE USING THE SAME

TECHNICAL FIELD

The present invention relates a light emitting module for electronic products, particularly to a backlight module and a liquid crystal display (LCD) using the same.

BACKGROUND

At present, LCDs as the display components of electronic devices are widely used in various electronic products, and the backlight module is one of the essential components of the LCDs. As shown in FIG. 1, the existing LCD 10 comprises a frame 12, a LCD panel 14 assembled on the frame 12, and a backlight module 16; wherein the backlight module 16 comprises an optical diaphragm 161, a light guide plate 162, a lamp tube 163, a reflection sheet 164 and a backplane 165. The light guide plate 162 is arranged under the optical diaphragm 162 in a stacked mode; the lamp tube 163 is arranged on one side of the light guide plates 162; the reflection sheet 164 is arranged under the light guide plate 162 in a stacked mode; the backplane 165 is arranged under the reflection sheet 164; and the backplane 165 is in the structure of a buckle plate in accordance with the design requirements of the structure and function of the backlight module 16, and is partially in contact with the reflection sheet 164 to support the reflection sheet 164. Wherein, the reflection sheet 164 is used for reflecting the light emitted by the lamp tube 163 to the light guide plates 163. However, the reflection sheet 164 is easily affected by heat and then is softened to cause a large droop, particularly in the position close to a heat source, such as light beams, etc. The common solutions include adding reinforcing ribs 166 in the space between the reflection sheet 164 and the backplane 165, and the reflection sheet 164 is supported by the reinforcing ribs 166 (as shown in FIG. 1); or supporting bumps 167 are arranged on the backplane 165 (as shown in FIG. 2); or strips of adhesive tapes are applied on the bottom surface of the reflection sheet 164 (not shown in the figure). However, the addition of the reinforcing ribs 166 will obviously increase the cost of both the parts and the die, and also will increase the weight of the overall backlight module 16; the supporting bumps 167 will make the backplane become more complex, and increase the possibility of warp, and may cause other structural problems; the adhesive tape will increase the cost and bring trouble to the overall performance.

SUMMARY

In view of the above, the present invention aims to provide a backlight module which effectively prevents the reflection sheet from drooping and is also of low cost and simple structure.

In order to solve the above technical problems, the present invention provides a backlight module, and the backlight module comprises a light guide plate, a reflection sheet and a backplane, wherein the reflection sheet is arranged under the light guide plate; the backplane is arranged under the reflection sheet and partially supports the reflection sheet; and the reflection sheet is bent to form one or more supporting ribs for supporting the backplane to prevent the reflection sheet from drooping.

Wherein, the one or more supporting ribs are formed by bending the end of the reflection sheet and is positioned in the space between the reflection sheet and the backplane, and the end of the one or more supporting ribs are abutted by the backplane.

The cross sections of the one or more supporting ribs are of triangular shape, and the one or more supporting ribs with triangular cross sections have the advantages of stable support and simple structure.

Wherein, the reflection sheet comprises multiple supporting ribs formed by bending one end of the reflection sheet, and the supporting ribs support different sections of the reflection sheet.

Wherein, the one or more supporting ribs form an end section for abutting with the backplane in parallel to achieve surface contact.

Wherein, contact included angle between the one or more supporting ribs and the reflection sheet is 90°. Such design provides better support for the reflection sheet.

Wherein, a cut mark line is formed at the upper bending position of the reflection sheet.

Wherein, the reflection sheet is pasted with a double sided adhesive tape for bonding the reflection sheet to the light guide plate.

Wherein, the backplane is in the structure of a bent buckle plate, and comprises multiple high sections and multiple low sections, wherein the high sections are abutted by the reflection sheet to support the reflection sheet; and a space is formed between the low sections and the reflection sheet.

In addition, the present invention provides a LCD using the backlight module.

A LCD comprises any of the above backlight modules.

The present invention solves the problem in the prior art that the reflection sheet is affected by heat and then is easy to droop, by bending the reflection sheet of the backlight module to form the one or more supporting ribs for supporting the reflection sheet, and has the advantages of low cost, simple structure and has no negative influence on other components and the system structure of the backlight module.

DETAILED DESCRIPTION

In order to describe the technical content, the structural feature, the purpose and the effect of the present invention, the invention will further be described in detail in accordance with its preferred embodiments and the figures.

Figure 1:
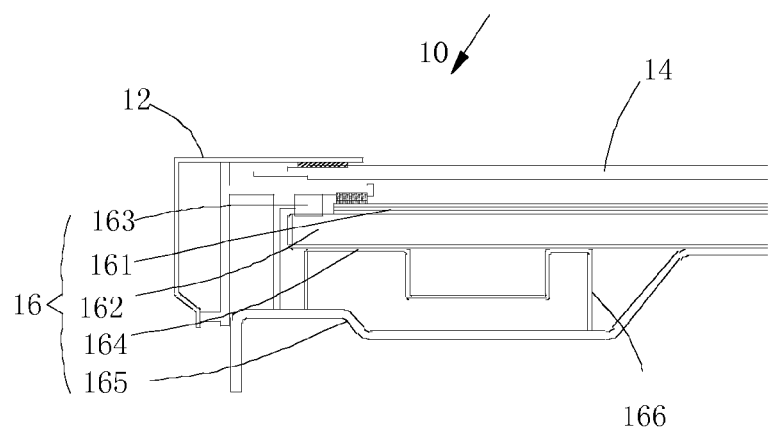
FIG. 1 is the cross sectional diagram of the existing LCD.
Figure 2:
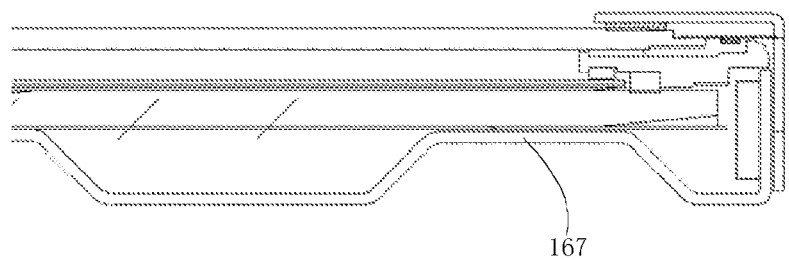
FIG. 2 is the cross sectional diagram of another existing LCD.
Figure 3:
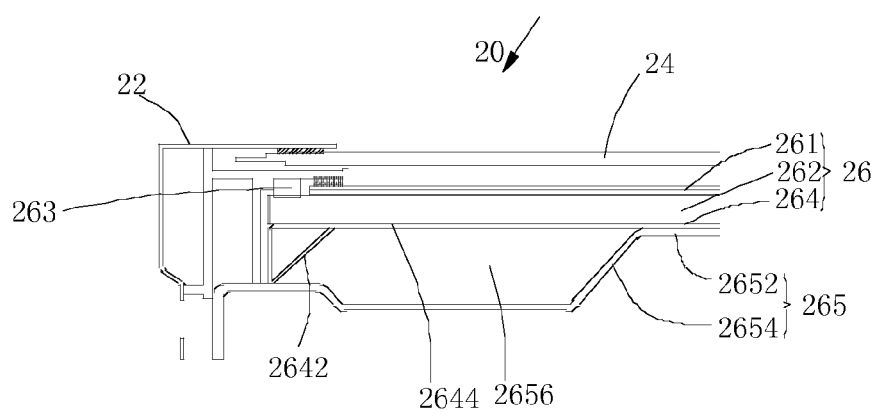
FIG. 3 is the cross sectional diagram of a first preferred embodiment of a LCD using backlight module of the present invention.

As shown in FIG. 3, the LCD 20 of a first preferred embodiment of the present invention comprises a frame 22, a LCD panel 24 assembled on the frame 22, and a backlight module 26, wherein the backlight module 26 comprises an optical diaphragm 261, a light guide plate 262, a lamp tube 263, a reflection sheet 264 and a backplane 265.

The light guide plate 262 is arranged under the optical diaphragm 261 in a stacked mode and plays a role of guiding light; the lamp tube 263 is arranged on one side of the light guide plate 262 and is used as the light source of the backlight module 20; and the reflection sheet 264 is arranged under the light guide plate 262 and is used for reflecting the light emitted by the lamp tube 263 to the light guide plate 262. The reflection sheet 264 can be made of one or multiple materials of PC, ABS/PMMA, MS, PE, PS, PP and PVC. The reflection sheet 264 forms a supporting rib 2642. The supporting rib 2642 is formed by bending one end of the reflection sheet 264, and is positioned in the space 2656 formed by the reflection sheet 264 and the backplane 265. One end of the supporting rib 2642 is abutted by the backplane 265 to support the reflection sheet 264. Preferably, the cross section of the supporting rib is of a triangular shape, and the supporting rib with a triangular cross section has the advantages of stable support and simple structure. The contact included angle between the supporting rib and the reflection sheet is 90°, namely the triangle is a right triangle, to better support the reflection sheet.

The specific process for forming the supporting rib 2642 can comprise: setting the bending position in accordance with the existing suspending environment of the reflection sheet 264; cutting to form a cut mark line in the bending position of the reflection sheet 264 (not shown in the figure); bending the reflection sheet 264 downwards in accordance with the cut mark line to form the supporting rib 2642. The reflection sheet 264 can be pasted with a double sided adhesive tape 2644 for bonding the reflection sheet 264 to the light guide plate 262. In the first preferred embodiment, the double sided adhesive tape 2644 is arranged at one end adjacent to the supporting rib 2642.

The backplane 265 is arranged under the reflection sheet 264 and is in the structure of a bent buckle plate to meet the design requirements of the structure and function of the backlight module 26. The backplane 265 comprises multiple high sections 2652 and multiple low sections 2654, wherein the high sections 2652 are in contact with the reflection sheet 264 to support the reflection sheet 264; and a space 2656 is formed between the low sections 2654 and the reflection sheet 264.

The present invention solves the problem that the reflection sheet 264 is affected by heat and then is easy to droop, by bending the reflection sheet 264 of the backlight module 26 of the LCD 20 to form the supporting rib 2642 for supporting the reflection sheet 264, and has the advantages of low design cost, simple structure and no negative influence on other components and the system structure of the backlight module 26.

Figure 4:
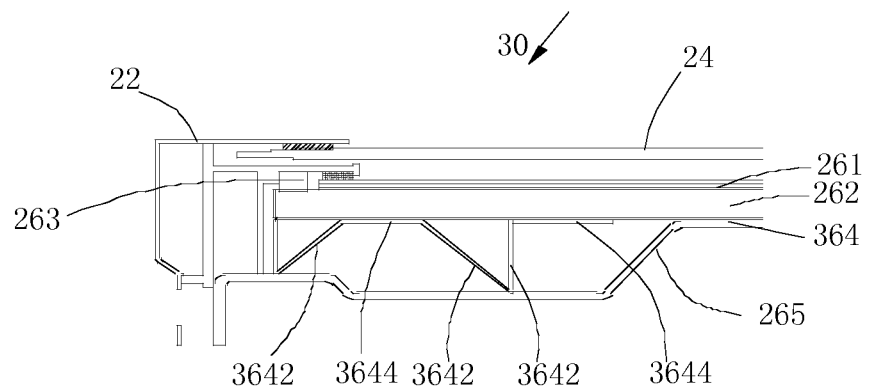
FIG. 4 is the cross sectional diagram of a second preferred embodiment of a LCD using backlight module of the present invention.

As shown in FIG. 4, the structure of the LCD 30 of a second preferred embodiment of the present invention is nearly the same as that of the LCD 20 of the first preferred embodiment, and the structure of the LCD 30 is different from the structure of the LCD 20 in the mode that multiple drooping sections may be formed because the reflection sheet 364 has different section differences, and one end of the reflection sheet 364 of the backlight module of the second preferred embodiment is bent to form multiple supporting ribs 3642 to support different sections of the reflection sheet 364. The supporting ribs 3642 are also formed by repeatedly bending one end of the reflection sheet 364, and the supporting ribs 3642 support different sections of the reflection sheet 364 as required. The section of the reflection sheet 364 in contact with the light guide plate 362 is also bonded by the double sided adhesive tape 3644.

Figure 5:
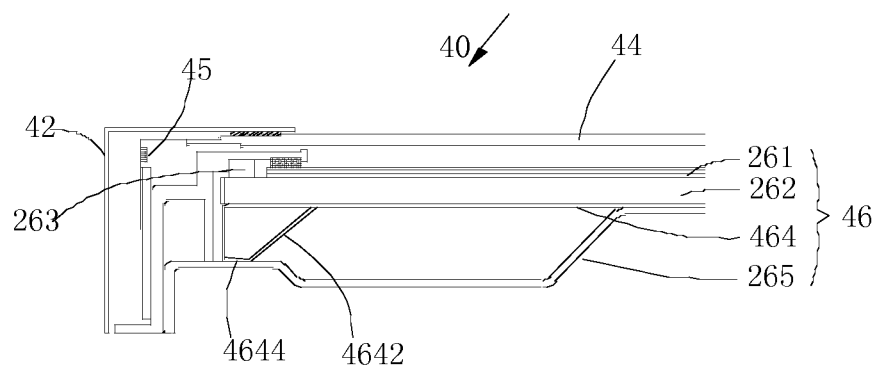
FIG. 5 is the cross sectional diagram of a third preferred embodiment of a LCD using backlight module of the present invention.

As shown in FIG. 5, the structure of the LCD 40 of a third preferred embodiment of the present invention is nearly the same as that of the LCD 20 of the first preferred embodiment, and the structure of the LCD 40 is different from the structure of the LCD 20 in the mode that the reflection sheet 464 of the backlight module 46 comprises a supporting rib 4642, and the supporting rib forms an end section 4644 abutted by the backplane 465 in parallel, to keep the stability of the supporting rib 4642 for supporting the reflection sheet 464 better. The contact included angle between the supporting rib and the reflection sheet can also be 90°, to better support the reflection sheet. In addition, all components of the backlight module 46 of the LCD 40 are fixed by the assembly frame 42. The assembly frame 42, the peripheral frame 43 and the LCD panel 44 are assembled to form the LCD 40. In addition, the partial contact surface of the assembly frame 42 is bonded to the partial contact surface of the peripheral frame 43 by the double sided adhesive tape 45.

In summary, the present invention solves the problem that the reflection sheet is affected by heat and then is easy to droop, by setting the bending position on the reflection sheet of the backlight module of the LCD of the present invention in accordance with the existing suspending environment, cutting to form a cut mark line in the bending position of the reflection sheet, bending the reflection sheet in accordance with the cut mark line to form the one or more supporting ribs, pasting a double sided adhesive tape in the position of the reflection sheet to be fixed to bond to the light guide plate, and fully supporting the reflection sheet by the one or more supporting ribs to prevent the reflection sheet from drooping, and has the advantages of low design cost, simple structure and no negative influence on other components and the system structure of the backlight module.

The present invention is only described in accordance with the above specific preferred embodiments. However, this invention is not limited to the specific embodiments. All the equivalent structures or equivalent processes changed according to the specification and figure contents of the present invention or directly or indirectly used in other related technical fields should belong to the protection scope of the patent of the present invention.

I claim:

1. A backlight module, comprising: a light guide plate, a reflection sheet and a backplane; said reflection sheet is arranged under the light guide plate; said backplane is arranged under the reflection sheet and partially supports the reflection sheet; and said reflection sheet is bent to form one or more supporting ribs supporting the backplane to prevent the reflection sheet from drooping.

2. The backlight module of claim 1, wherein said one or more supporting ribs are formed by bending one end of the reflection sheet and are positioned in the space formed by the reflection sheet and the backplane, and one end of the one or more supporting ribs are abutted by said backplane.

3. The backlight module of claim 1, wherein the cross sections of said one or more supporting ribs are in a triangular shape.

4. The backlight module of claim 1, wherein said reflection sheet comprises multiple supporting ribs formed by bending one end of the reflection sheet, and the supporting ribs support different sections of the reflection sheet.

5. The backlight module of claim 1, wherein said one or more supporting ribs form an end section for abutting with the backplane in parallel to achieve surface contact.

6. The backlight module of claim 1, wherein the contact included angle between said one or more supporting ribs and the reflection sheet is 90°.

7. The backlight module of claim 1, wherein a cut mark line is formed at the upper bending position of said reflection sheet.

8. The backlight module of claim 1, wherein said reflection sheet is pasted with a double sided adhesive tape for bonding the reflection sheet to the light guide plate.

9. The backlight module of claim 1, wherein said backplane is in the structure of a bent buckle plate, and comprises multiple high sections and multiple low sections, wherein said high sections are abutted by the reflection sheet to support the reflection sheet; and a space is formed between said low sections and the reflection sheet.

10. A LCD, comprising: a backlight module, and said backlight module comprises a light guide plate, a reflection sheet and a backplane, said reflection sheet is arranged under the light guide plate; said backplane is arranged under the reflection sheet and partially supports the reflection sheet; and said reflection sheet is bent to form one or more supporting ribs supporting the backplane to prevent the reflection sheet from drooping.

11. The LCD of claim 10, wherein said one or more supporting ribs are formed by bending one end of the reflection sheet and is positioned in the space formed by the reflection sheet and the backplane, and one end of the one or more supporting ribs are abutted by said backplane.

12. The LCD of claim 10, wherein the cross sections of said one or more supporting ribs are in a triangular shape.

13. The LCD of claim 10, wherein said reflection sheet comprises multiple supporting ribs formed by bending one end of the reflection sheet, and said supporting ribs support different sections of the reflection sheet.

14. The LCD of claim 10, wherein said one or more supporting ribs form an end section for abutting with the backplane in parallel to achieve surface contact.

15. The LCD of claim 10, wherein the contact included angle between said one or more supporting ribs and the reflection sheet is 90°.

16. The LCD claim 10, wherein a cut mark line is formed at the upper bending position of said reflection sheet.

17. The LCD claim 10, wherein said reflection sheet is pasted with a double sided adhesive tape for bonding the reflection sheet to the light guide plate.

18. The LCD of claim 10, wherein said backplane is in the structure of a bent buckle plate, and comprises multiple high sections and multiple low sections, wherein said high sections are abutted by the reflection sheet to support the reflection sheet; and a space is formed between said low sections and the reflection sheet.

* * * * *